US012653158B1

(12) United States Patent
Wilson

(10) Patent No.: US 12,653,158 B1
(45) Date of Patent: Jun. 16, 2026

(54) LIONFISH POPULATION REDUCTION

(71) Applicant: Michael D. Wilson, Diamondhead, MS (US)

(72) Inventor: Michael D. Wilson, Diamondhead, MS (US)

( * ) Notice: Subject to any disclaimer, the term of this patent is extended or adjusted under 35 U.S.C. 154(b) by 0 days.

(21) Appl. No.: 19/452,334

(22) Filed: Jan. 18, 2026

Related U.S. Application Data

(60) Provisional application No. 63/750,926, filed on Jan. 29, 2025.

(51) Int. Cl.
A01K 21/00 (2006.01)

(52) U.S. Cl.
CPC .................................... A01K 21/00 (2013.01)

(58) Field of Classification Search
CPC ........ A01K 21/00; A01K 67/00; A01K 61/00; A01K 61/10; A01K 61/90; A61D 19/00; A61D 19/022; A61D 19/024
See application file for complete search history.

(56) References Cited

U.S. PATENT DOCUMENTS

2003/0208945 A1 * 11/2003 Hill ...................... A01K 27/006
43/4

* cited by examiner

*Primary Examiner* — Kristen C Hayes
(74) *Attorney, Agent, or Firm* — Philip L. Bateman

(57) ABSTRACT

The population of lionfish in an environment is reduced by: (a) obtaining a male lionfish having a body with a urogenital opening; (b) attaching a channel to its body, the channel having an inlet at the urogenital opening and having an outlet spaced apart from the inlet; and (c) releasing the male lionfish into the environment.

10 Claims, 4 Drawing Sheets

LIONFISH POPULATION REDUCTION

CROSS-REFERENCE TO RELATED APPLICATION

This application claims the benefit of U.S. Provisional Patent Application Ser. No. 63/750,926 Jan. 29, 2025

FIELD OF THE INVENTION

The invention relates to fishing, animal husbandry, and the control of wild fish.

BACKGROUND OF THE INVENTION

The genus *Pterois* includes several species of carnivorous marine fish having venomous spines that are native to the Pacific Ocean. The fish are commonly known as lionfish. Lionfish are popular in aquariums because of their distinctive appearance.

Lionfish reproduce in a two-step procedure. The first step is a female releases two egg clusters from its urogenital opening (also referred to as its urethra or urethral opening). Each egg cluster contains thousands of eggs within a sac. The second step is a male releases sperm through its urogenital opening directly over, and in close proximity to, the clusters. FIG. 1 illustrates the second step with a male lionfish 10 releasing sperm 20 over two egg clusters 30.

Lionfish inadvertently released from aquariums in the Caribbean Sea have thrived and have reduced the population of native fishes. According to some estimates, lionfish have significantly reduced the diversity of fish on some Caribbean reefs. Lionfish are considered an invasive species and attempts to reduce their population are being made. Unfortunately, the attempts have had little effect to date.

Undesirable animal populations have been reduced by sterilizing males and then introducing them into the wild. For example, mosquito and other insects have been reduced by sterilizing males with radiation. Sterilization of males is not feasible with lionfish.

Accordingly, a demand exists for an improved method for reducing the population of lionfish in an environment.

SUMMARY OF THE INVENTION

The general object of this invention is to provide an improved method for reducing the population of lionfish in an environment.

I have invented a method for reducing the population of lionfish in an environment. The method comprises: (a) obtaining a male lionfish having a body with a urogenital opening; (b) attaching a channel to its body, the channel having an inlet at the urogenital opening and having an outlet spaced apart from the inlet; and (c) releasing the male lionfish into the environment.

The method of this invention is effective at reducing the population of lionfish in an environment.

DETAILED DESCRIPTION OF THE INVENTION

This invention is best understood by the reference to the drawings. When it is desired to reduce the population of lionfish in an environment, a number of lionfish are obtained from the environment or from a different source. The males are then isolated using known techniques.

Figure 1:
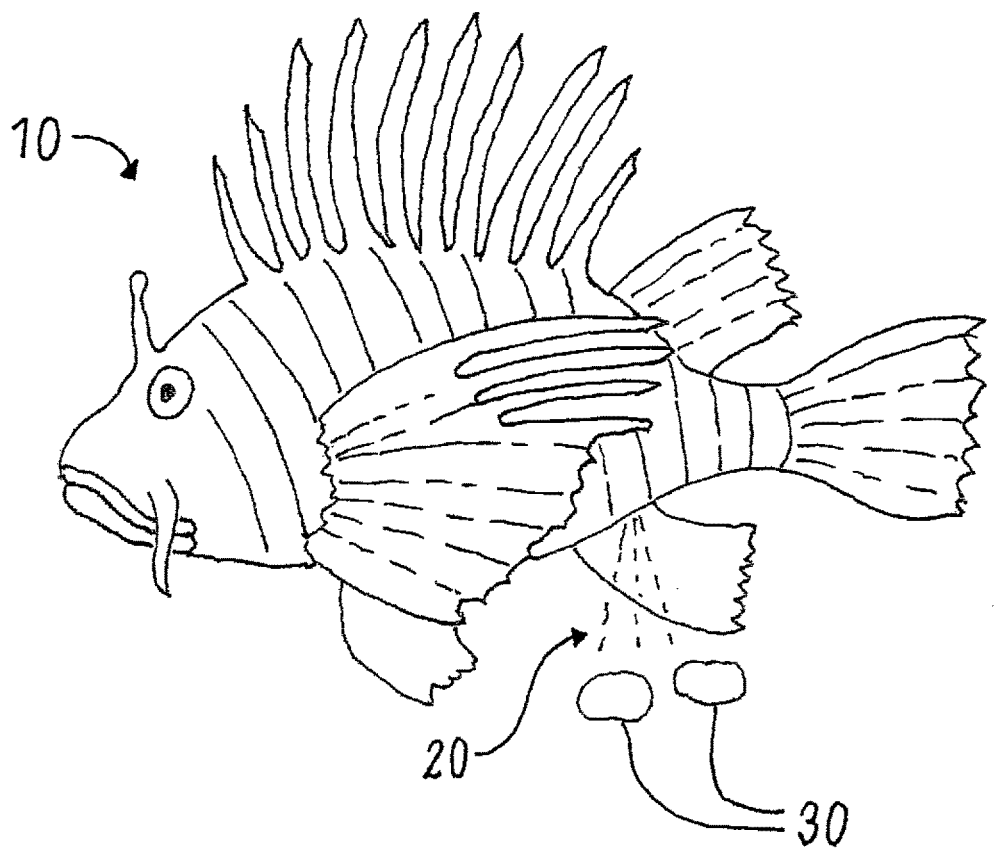
FIG. 1 is a male lionfish releasing sperm to fertilize two egg clusters.
Figure 2:
FIG. 2 is a channel about to be attached to the urogenital opening of a male lionfish.
Figure 2:
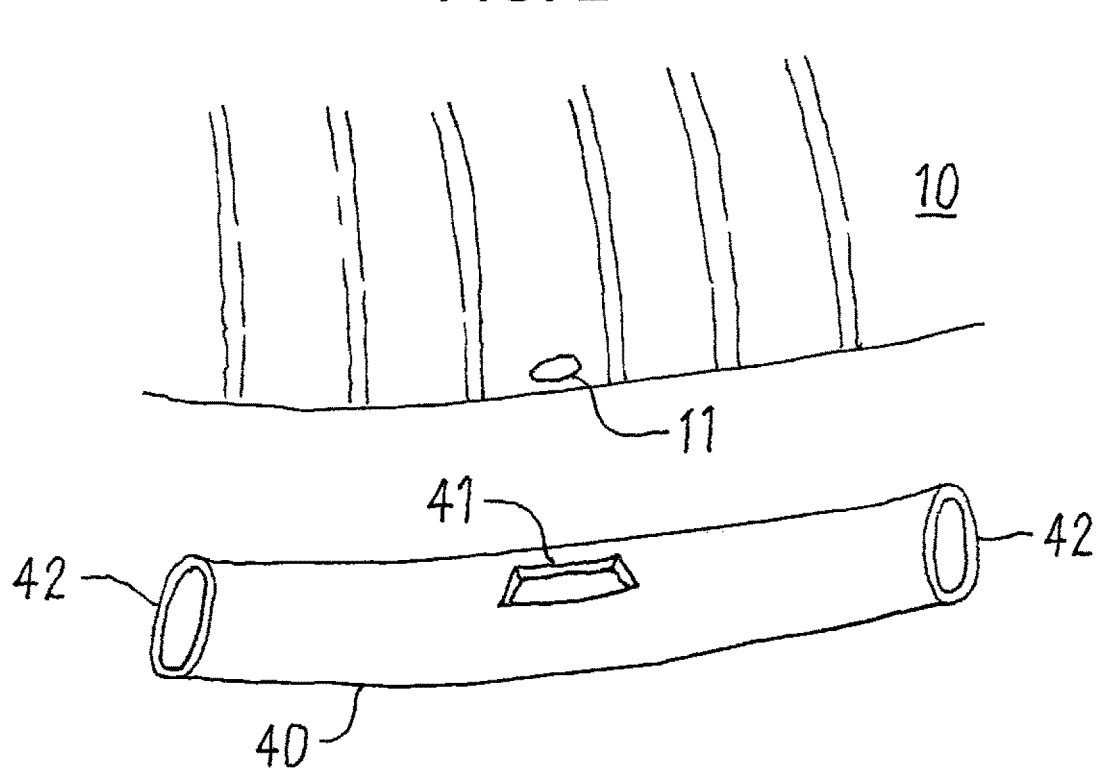

The next step is to obtain a channel 40 having an inlet 41 and at least one outlet 42. The channel shown in FIG. 2 is a plastic tube having outlets at each end and a rectangular inlet located midway between the outlets. The size, shape, and material of the channel are matters of choice. A suitable channel is small diameter thermoplastic tubing. The next step is to attach the channel 40 to the male lionfish 10 with the channel inlet directly over the urogenital opening 11. The male lionfish are then released into the environment.

Figure 3:
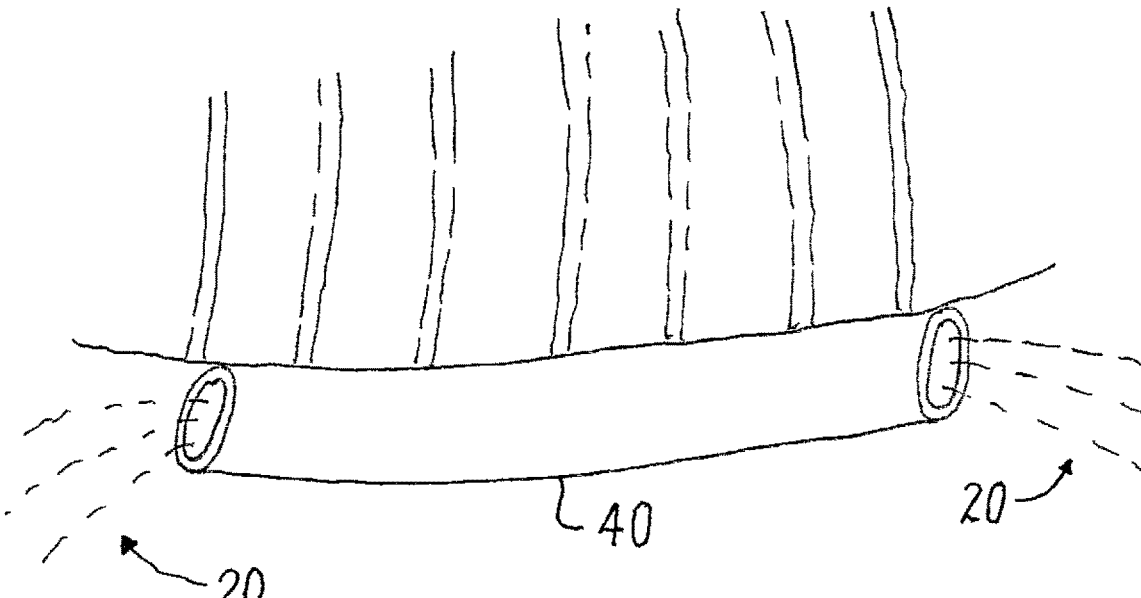
FIG. 3 is a male lionfish releasing sperm with a channel attached.

If and when the male lionfish has an opportunity to release sperm over egg clusters, the attached channel directs the sperm away from the clusters where they are carried away by the water current and do not fertilize the eggs. The diversion of the sperm is shown in FIG. 3.

Figure 4:
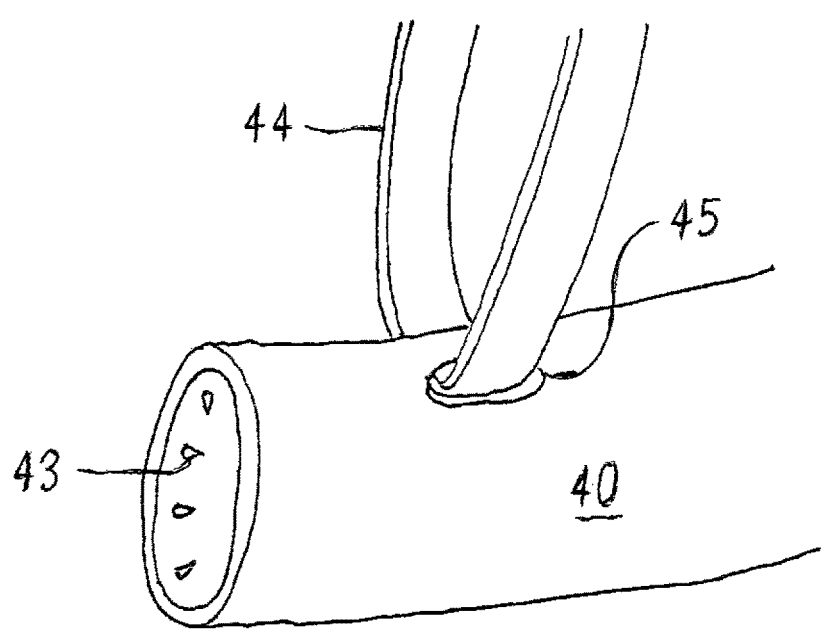
FIG. 4 is a detail of the interior of a first alternate embodiment of the channel.
Figure 5:
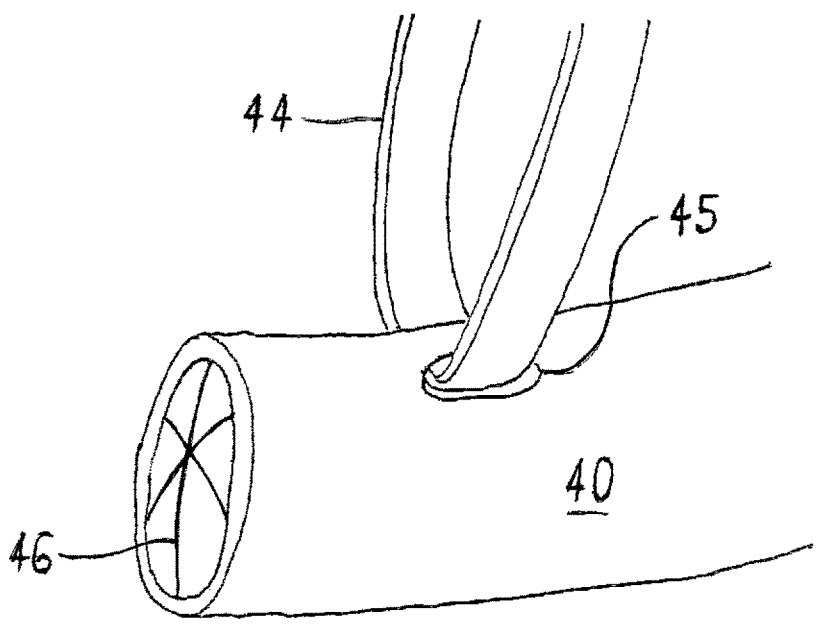
FIG. 5 is a detail of the interior of a second alternate embodiment of the channel.

The channel is most effective when attached to a male lionfish. However, attaching the channel to a female lionfish is also effective at preventing fertilization by interfering with the release of the egg cluster sacs into the water. A first means of interference is accomplished by puncturing the sacs to allow the individual eggs to quickly disperse upon exiting the channel. Puncturing is enhanced by incorporating sharp projections 43 in the inner surface of the channel as shown in FIG. 4. Other projections are also suitable for puncturing the egg cluster sacs. A second means of interference is accomplished by retaining the egg cluster sacs in the channel while allowing urine to exit. Retention is effected by incorporating filaments 46, netting, or other suitable barriers at the outlet ends of the channel as shown in FIG. 5.

Figure 6:
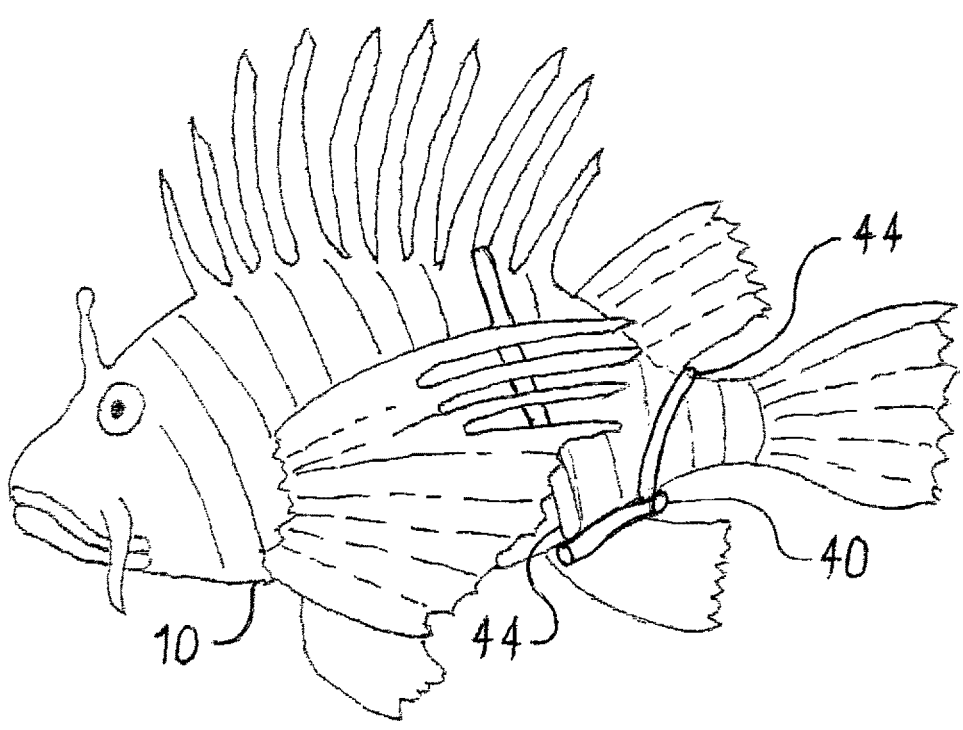
FIG. 6 is an alternate embodiment for attaching the channel.

There are several suitable methods for attaching the channel. One method is to glue the channel to the fish. Adhesives for thermoplastics and fish flesh are well known. A second method is to secure the channel with bands 44 as shown in FIGS. 4 to 6 The bands are attached to the channel with adhesive or by passing through one or more holes 45 in the channel. The adhesive method and the band method are combined if desired for an even more secure attachment. A variety of other methods of attaching a plastic item to a fish are also known and are suitable. The attached channel does not interfere with the lionfish's ability to swim or perform other functions.

Every time a male lionfish fitted with a channel unsuccessfully attempts to fertilize an egg cluster, a reduction occurs in the population from what would have occurred were it not for the channel. The reduction in population in an environment depends on the number of male lionfish having an attached channel, the percentage of the total male population they represent, and the time.

While the invention is especially suited for reducing a lionfish population, it can be used to reduce the population of any type of fish that reproduces in a manner similar to the lionfish.

I claim:

1. A method for reducing a population of lionfish in an environment, the method comprising:

(a) obtaining a male lionfish having a body with a urogenital opening;

(b) attaching a channel to its body, the channel having an inlet at the urogenital opening and having an outlet spaced apart from the inlet; and (c) releasing the male lionfish into the environment.

2. The method of claim 1 wherein the channel is attached with an adhesive.

3. The method of claim 1 wherein the channel is attached with a band that encircles the male lionfish.

4. The method of claim 1 wherein the channel is tubular with two ends forming outlets.

5. The method of claim 1 wherein the channel has an inner surface with sharp projections.

6. A method for reducing a population of a fish in an environment, the method comprising:

(a) obtaining a fish having a body with a urogenital opening from which male fish release sperm and from which female fish release egg clusters;

(b) attaching a channel to its body, the channel having an inlet at the urogenital opening and having an outlet spaced apart from the inlet; and (c) releasing the fish into the environment.

7. The method of claim 6 wherein the channel is attached with an adhesive.

8. The method of claim 6 wherein the channel is attached with a band that encircles the fish.

9. The method of claim 6 wherein the channel has an inner surface with sharp projections that are adapted to puncture an egg cluster.

10. The method of claim 6 wherein the outlet of the channel has a barrier that is adapted to retain an egg cluster while allowing urine to escape.

\* \* \* \* \*